United States Patent
Ozaki et al.

(10) Patent No.: US 9,534,145 B2
(45) Date of Patent: Jan. 3, 2017

(54) METHOD FOR FORMING DENSE SILICIC FILM

(71) Applicants: Yuki Ozaki, Shizuoka (JP); Takaaki Sakurai, Shizuoka (JP); Masakazu Kobayashi, Shizuoka (JP)

(72) Inventors: Yuki Ozaki, Shizuoka (JP); Takaaki Sakurai, Shizuoka (JP); Masakazu Kobayashi, Shizuoka (JP)

( * ) Notice: Subject to any disclaimer, the term of this patent is extended or adjusted under 35 U.S.C. 154(b) by 0 days.

(21) Appl. No.: 14/430,740

(22) PCT Filed: Oct. 9, 2013

(86) PCT No.: PCT/JP2013/077487
§ 371 (c)(1),
(2) Date: Mar. 24, 2015

(87) PCT Pub. No.: WO2014/057980
PCT Pub. Date: Apr. 17, 2014

(65) Prior Publication Data
US 2015/0252222 A1  Sep. 10, 2015

(30) Foreign Application Priority Data

Oct. 11, 2012  (JP) .................. 2012-226078

(51) Int. Cl.
| | | |
|---|---|---|
| *B05D 3/06* | (2006.01) | |
| *C09D 183/16* | (2006.01) | |
| *C08J 7/04* | (2006.01) | |
| *C08J 7/12* | (2006.01) | |
| *C23C 18/12* | (2006.01) | |
| *C23C 18/14* | (2006.01) | |
| *C01B 21/068* | (2006.01) | |
| *C08J 7/00* | (2006.01) | |

(52) U.S. Cl.
CPC ............. *C09D 183/16* (2013.01); *B05D 3/067* (2013.01); *C01B 21/068* (2013.01); *C08J 7/00* (2013.01); *C08J 7/047* (2013.01); *C08J 7/123* (2013.01); *C23C 18/122* (2013.01); *C23C 18/1233* (2013.01); *C23C 18/1241* (2013.01); *C23C 18/1245* (2013.01); *C23C 18/14* (2013.01); *C08J 2483/16* (2013.01)

(58) Field of Classification Search
CPC ...... B05D 3/067; C09D 183/16; C23C 18/122
See application file for complete search history.

(56) References Cited

U.S. PATENT DOCUMENTS

| | | | | |
|---|---|---|---|---|
| 2005/0279255 A1* | 12/2005 | Suzuki | ............... | C04B 41/009 106/287.11 |
| 2010/0166977 A1* | 7/2010 | Brand et al. | ............. | C08J 7/074 427/515 |
| 2011/0005763 A1 | 1/2011 | O'Brien et al. | | |

FOREIGN PATENT DOCUMENTS

| | | |
|---|---|---|
| JP | 10-279362 A | 10/1998 |
| JP | 2004-155834 A | 6/2004 |
| JP | 2009-503157 A | 1/2009 |
| JP | 2011-143327 A | 7/2011 |
| JP | 2011-146226 A | 7/2011 |
| JP | 2012-56101 A | 3/2012 |
| JP | 2013-52561 A | 3/2013 |
| WO | WO 2011/086839 A1 | 7/2011 |
| WO | WO 2012/026482 A1 | 1/2012 |

OTHER PUBLICATIONS

Ninad Shinde et al., "Spin-on silicon-nitride Films for Photolithography by RT Cure of Polysilazane", J. Photopolymer Sci, and Tech. vol. 23 No. 2, pp. 225-230 (2010).
L Prager et al Biannual Reports Leibniz-Institut fur Oberflachenmodifizierung e.v. Biannual Report 2008_2009 "UV-Induced Conversion of Polysilazanes into SiOx Networks, Access to Flexible, Bransparent, Barrier Coatings," pp. 18 to 21 from web site http://www.uni-leipzig.de/~iom/download/iom0809.pdf, 2008.
Naganuma et al Journal of Ceramic Society of Japan, "Formation of Silica Coatings from Perhydropolysilazane Using Vacuum Ultraviolet Excimer Lamp," 112 [11] pp. 599 to 603, 2004.

* cited by examiner

*Primary Examiner* — Margaret Moore
(74) *Attorney, Agent, or Firm* — Mitchell Brustein

(57) ABSTRACT

The present invention provides a dense silicic film and a producing method thereof. This method comprises coating a composition for coating film, which comprises a polymer having a silazane bond on a substrate, on a substrate, irradiating with light having a maximal peak in the range of 160-179 nm wavelength, and then irradiating with light having 10-70 nm wavelength longer maximal peak wavelength than the light used in the previous irradiation.

19 Claims, 1 Drawing Sheet

US 9,534,145 B2

METHOD FOR FORMING DENSE SILICIC FILM

This application is a United States National Stage Patent Application under 35 U.S.C. §371 of International Patent Application No. PCT/JP2013/077487, filed Oct. 9, 2013, which claims priority to Japanese Patent Application No. 2012-226078, filed Oct. 11, 2012, the contents of which are being hereby incorporated herein by reference.

TECHNICAL FIELD

The present invention relates to methods for producing silicic dense film, which can be used for manufacturing semiconductor devices.

BACKGROUND ART

Silicic films, which are relatively hard and dense, are used in various applications, specifically a hard-coat film, a gas barrier film and a reinforcement film for substrates and circuits and the like in the semiconductor manufacturing industry. Various silicic films for such applications have been investigated. Non-Patent Document 1 discloses a method for forming a SiON layer by coating polysilazane on a substrate, drying, and then irradiating with excimer laser (wavelength 172 nm) in an inert gas atmosphere. Patent Document 1 also discloses a method for forming a high-performance gas barrier film using a similar method. Thus, methods for high-performance silicic films have been investigated by using a composition having Si—N, Si—H and N—H bonds.

In particular, Patent Document 1 discloses a method of repeating manufacturing steps for forming film to obtain more stable film. However, the present inventors have found that density of the film may be insufficient when irradiation light is limited to 172 nm wavelength. Patent Document 2 also discloses a method for forming a siliceous film by coating polysilazane containing a catalyst on a substrate, drying, and then irradiating with vacuum ultraviolet (wavelength under 230 nm) and ultraviolet (wavelength 230-300 nm) simultaneously, tandemly or alternately in a water vapor atmosphere. However, there is still room for improvement in terms of density of the siliceous film.

Patent Document 3 also discloses that gas barrier performance is degraded in consequence of increased concentration of Si—O bonds in a formed film, which is irradiated with vacuum ultraviolet light in a high-oxygen atmosphere. According to this disclosure, a film having many Si—N bonds, not Si—O bonds, is considered to be preferred to achieve a high-performance gas barrier film.

PRIOR ART DOCUMENTS

Patent Documents

[Patent document 1] Japanese Patent Laid-Open No. 2011-146226
[Patent document 2] Japanese Patent Publication No. 2009-503157
[Patent document 3] Japanese Patent Laid-Open No. 2011-143327

Non-Patent Documents

[Non-Patent document 1] Journal of Photopolymer Science and Technology Volume 23, Number 2 (2010) 225-230

DISCLOSURE OF INVENTION

Problem to be Solved by the Invention

To solve the above problems, it is an object of the present invention to provide a method for forming silicic dense (high-density silicon based) film that contains a low content of Si—O bonds.

Means for Solving Problem

The present invention resides in a method for forming silicic dense film comprising:
(1) a composition preparing step, in which a composition for a coating film comprising a polymer having a silazane bond and a solvent is prepared;
(2) a coating step, in which a coated film is formed by coating said composition for a coating film on a substrate;
(3) the first irradiating step, in which said coated film is irradiated with light having a maximal peak in the range of 160-179 nm wavelength; and
(4) the second irradiating step, in which coated film after the first irradiating step is irradiated with light having 10-70 nm wavelength longer maximal peak wavelength than the light used in the first irradiating step.

The prevent invention also resides in a dense silicic film formed by said method.

Effect of the Invention

The present invention enables to form a dense and excellent gas barrier performance silicic film as a result of a low content of Si—O bonds and a high content of Si—N bonds.

BEST MODE FOR CARRYING OUT THE INVENTION

Figure 1:
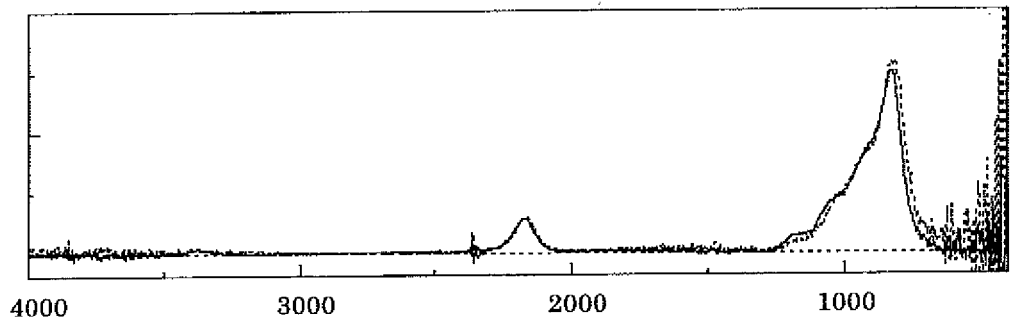
FIG. 1 is IR spectra after irradiation process (broken line) and after superheated steam process (solid line) at Example 5.

Embodiments of the present invention are described in detail.

In the present invention, a dense silicic film is provided on one or both sides of a substrate. The substrate is not limited and can be freely selected from metallic materials, ceramics and organic materials. Specifically, a bare silicon wafer and a silicon wafer coated with, for example, a thermal oxide film can be used. A dense silicic film can be formed on not only one side but also both sides of a substrate. In this case, a substrate should be selected according to the intended use.

In a method for forming a gas barrier film according to the present invention, a substrate surface is coated with a composition for a coating film comprising a polymer having a silazane bond and a solvent. The polymer having a silazane bond used in the present invention is not limited and can be freely selected unless it impairs the effect of the invention. Typically, a polysilazane compound can be used. When a polysilazane compound is used, either an inorganic or organic compound can be selected. Examples of the inorganic polysilazane compound include a perhydropolysilazane which has a straight-chain structure comprising structural units represented by the following formulas (I):

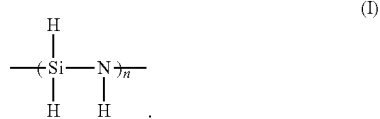

The perhydropolysilazane, which can be produced by any of the known processes, includes a chain structure part and a cyclic structure part in the molecule, and is represented by the following formula:

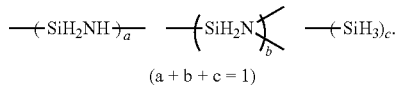

(a + b + c = 1)

An organo polysilazane also can be used. Examples also include an organo polysilazane compound or a modification compound thereof, which has a skeleton mainly comprising a structural unit represented by the following formula (II)

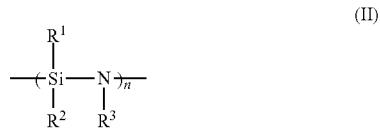

wherein each of $R^1$, $R^2$ and $R^3$ is independently a hydrogen atom, an alkyl group, an alkenyl group, a cycloalkyl group, an aryl group, an alkoxy group, an amino group or a silyl group and at least one of $R^1$, $R^2$ and $R^3$ is a hydrogen atom. Here, groups other than a hydrogen atom are optionally substituted by one or more groups such as a halogen atom such as fluorine, an alkyl group, an alkoxy group, an amino group, a silyl group or an alkylsilyl group. Specifically, examples which may use for $R^1$, $R^2$ and $R^3$ include: a fluoroalkyl group, a perfluoroalkyl group, a silylalkyl group, a trisilylalkyl group, an alkylsilylalkyl group, a trialkylsilyl group, an alkoxysilylalkyl group, a fluoroalkoxy group, a silylalkoxy group, an alkylamino group, an dialkylamino group, an alkylaminoalkyl group, an alkylsilyl group, a dialkylsilyl group, an alkoxysilyl group, a dialkoxysilyl group and a trialkoxysilyl group.

The molecular weight of the polysilazane compound used in the present invention is not limited but the average molecular weight of the compound in terms of polystyrene is preferably 1,000 to 20,000, more preferably 1,000 to 10,000.

Further, examples of the polymer having a silazane bond include a metallosilazane, a borosilazane and a siloxazane. Two or more polymers can be used in combination.

The composition for a coating film used in the present invention contains a solvent capable of dissolving the above polymer. Such a solvent is not limited and can be freely selected as long as it can dissolve the above components. Preferred examples of the solvent include:

(a) aromatic compounds, such as benzene, toluene, xylene, ethylbenzene, diethylbenzene, trimethylbenzene, triethylbenzene and tetrahydronaphthalene;

(b) saturated hydrocarbon compounds, such as n-pentane, i-pentane, n-hexane, i-hexane, n-heptane, i-heptane, n-octane, i-octane, n-nonane, i-nonane, n-decane and i-decane;

(c) alicyclic hydrocarbon compounds, such as ethylcyclohexane, methylcyclohexane, cyclohexane, cyclohexene, p-menthane, decahydronaphthalene, dipentene and limonene;

(d) ethers, such as dipropyl ether, dibutyl ether, diethyl ether, dipentyl ether, dihexyl ether, methyl tertiary butyl ether (hereinafter, referred to as MTBE) and anisole; and (e) ketones, such as methyl isobutyl ketone (hereinafter, referred to as MIBK).

Among them, more preferred are (b) saturated hydrocarbon compounds, (c) alicyclic hydrocarbon compounds, (d) ethers and (e) ketones.

These solvents can be used in combination of two or more to control the evaporation rate, to reduce the hazardousness to the human body and to control the solubility of the components.

Commercially available solvents can be adopted as these solvents. Examples include: PEGASOL 3040, EXXSOL D30, EXXSOL D40, EXXSOL D80, Solvesso 100, Solvesso 150, Isopar H, Isoper L (trade name, manufactured by Exxon Mobil Corporation), New Solvent A (trade name, manufactured by JX Nippon Oil & Energy Co.), Shellsol MC311, Shellsol MC811, Sol Eight Deluxe, New Shell Bright Sol (trade name, manufactured by Shell Chemicals Japan Ltd.) If a mixture of solvents is adopted in the present invention, the mixture preferably contains aromatic hydrocarbons in an amount of 30 wt % or less based on the total weight of the mixture so as to reduce the hazardousness to the human body.

Further, the composition for a coating film used in the present invention can contain an amine compound or a metal-complex compound. These compounds function as a catalyst for use in curing reaction of coated compound on a substrate.

It is possible to use one of the optional as an amine compound, but may be suitably, for example, aliphatic amines, aromatic amines or heterocyclic amines. Aliphatic amines or aromatic amines may be any of primary amines, secondary amines or tertiary amines. Further, these may have any number of nitrogen atoms such as monoamine, diamine, or triamine. Examples of heterocycle amines include a compound comprising pyrrole ring, pyridine ring, pyrazine ring, pyrimidine ring or triazole ring. Also, these amine compounds are optionally substituted by freely-selected substituent, for example, a group selected from the group consisting of alkoxy group, alkylene group, silyl group and alkylsilyl group.

Preferred examples of an amine compound include: dipropylamine, diisopropylamine, tripropylamine, butylamine, dibutylamine, tributylamine, isobutylamine, diisobutylamine, tert-butylamine, pentylamine, tripentylamine, hexylamine, N-methylhexylamine, N,N-dimethylhexylamine, N,N-dimethyl-2-ethylhexylamine, heptylamine, octylamine, di-n-octylamine, N-methyl di-n-octylamine, tri-n-octylamine, N,N,N',N'-tetramethyldiaminomethane, N,N'-dimethylethylenediamine, N,N,N',N'-tetramethylethylenediamine, N,N,N',N'-tetramethyl-1,3-propanediamine, N,N,N',N'-tetramethyl-1,4-butanediamine, N,N-di-tert-butylethylenediamine, N,N,N',N'-tetramethylhexamethylenediamine, N,N,N',N'-tetramethyl-1,8-octanediamine, allylamine, diallylamine, triallylamine, N-methyldiallylamine, N,N-dimethylallylamine, benzylamine, dibenzylamine, N-methylbenzylamine, N,N-dimethylbenzylamine, pyrrol, pyrroline, pyridine, picolin, lutidine, pyrazine, aminopyridine, aminomethylpyridine, phenylpyridine, vinylpyridine, aminopyrazine, 2-methoxyethylamine, 3-methoxypropylamine, 3-ethoxypropylamine, 3-propoxypropylamine, 3-isopropoxypropylamine, 3-butoxypropylamine, bis(2-aminoethylether), bis(3-aminopropylether), 3-(2-dimethylaminoethoxyl)propylamine, hexamethyldisilazane, tetramethyldisilazane and heptamethyldisilazane.

An amine compound is not limited unless it impairs the effects of the present invention. However it should be noted that using alcoholamine or some N-heterocyclic amines may cause increase Si—O bonds during curing reaction.

A metal complex compound is also freely-selected as long as it accelerates curing reaction of a coated film. Preferred examples of the metal are selected from the group consisting of nickel, titanium, platinum, rhodium, cobalt, iron, iridium, aluminum, ruthenium, palladium, rhenium and tungsten. Further, it is preferable to comprise a ligand selected from the group consisting of acetylacetonato group, carbonyl group or carboxylate group. The carboxylate group is preferably a residue of carboxylic acid selected from the group consisting of formic acid, acetic acid, propionic acid, butyric acid, octane acid, lauric acid, stearic acid, oleic acid, lactic acid, succinic acid and citric acid.

Preferred example of the metal complex compound include: tris(acetylacetonato)aluminium, tris(acetylacetonato)iron, tris(acetylacetonato)rhodium, tris(acetylacetonato)cobalt, tris(acetylacetonato)ruthenium, bis(acetylacetonato)palladium, hexacarbonyltungsten, dodecacarbonyltrirhthenium, dodecacarbonyldirhenium, palladium acetate, nickel benzoate, nickel octanoate, nickel oleate, iron formate, cobalt benzoate, cobalt citrate, cobalt formate, rhodium acetate(III), rhodium acetate(II), titanium oleate, aluminum gluconate, aluminum benzoate, and aluminum butyrate.

The composition used in the present invention can optionally contain other additives. Examples of the optional additives include crosslinking accelerators and viscosity modifiers. Further, the composition can contain a phosphorus compound, for example tris(trimethylsilyl)phosphate, for the sake of Na-gettering effect in the semiconductor manufacturing process.

The above polymer and, if necessary, other additives are dissolved or dispersed in the above solvent to prepare the composition for a coating film in the present invention. In this preparation, there are no particular restrictions on the order of dissolving the components in the solvent. Further, the solvent can be replaced after the components are made to react.

Further, the contained amount of each component depends on the application of the composition. To achieve adequate film thickness, the content of the polymer is preferably 0.1 to 40 wt %, more preferably 0.1 to 20 wt %, and further preferably 0.1 to 10 wt %. When the composition comprises the amine compound, the content of the amine compound is preferably more than a certain amount to accelerate curing reaction and less than a certain amount to maintain preservation stability of the composition. Thus, the content of the amine compound is preferably 0.005 to 0.50 mmol per 1 g polymer, more preferably 0.01 to 0.30 mmol. When the composition comprises the metal complex compound, the content of the metal complex compound is preferably more than a certain amount to accelerate adequate curing reaction and less than a certain amount to maintain preservation stability of the composition. Thus, the content of the metal complex compound is preferably 0.005 to 0.10 mmol per 1 g polymer, more preferably 0.01 to 0.06 mmol. When the composition comprises the metal complex compound, it is also possible to use a cosolvent such as anisole to promote the solubility.

A coating method to apply above composition on a substrate can be adopted from known methods, such as spin coating, dip coating, spray coating, roll coating, print-transfer coating and the like. Among them, spin coating is preferred. Thickness of a coated film is preferred to be set in order to cure efficiently when irradiated with UV light in the manner described later. When dense silicic films are formed on both sides of a substrate, it can be coated sequentially one side by one, or simultaneously on both sides.

The coated film formed on a substrate surface is then optionally dried to remove excess solvent. In this step, if the coated film is dried at relatively high temperature, the solvent can be efficiently removed. However, that is not preferred because such external thermal energy leads to increase the thermal energy cost. Consequently, the coated film is preferably dried without applying thermal energy. When the coated film is dried nevertheless at high temperature, the drying temperature is preferably 150° C. or below, more preferably 100° C. or below.

The coated film can also be dried under reduced pressure. Specifically, negative pressure can be applied to the coated substrate by means of for example a vacuum pump, a rotary pump, so as to accelerate evaporation of the solvent in the coated film and thereby to promote the drying.

The coated film, from which is removed excess solvent by drying, may be optionally blown by an inert gas such as nitrogen. This process can remove attached-matter on the surface of the coated film and enhance efficiency of light irradiation. Furthermore, it is possible to remove, for example, solvent on the surface by infrared-ray irradiation.

Subsequently, the coated film is irradiated with light. The conditions of the UV irradiation in the first irradiation step or the second irradiation step are properly selected according to the thickness, constituent hardness, and the like of the aimed gas barrier film.

First, irradiation light used in the first irradiation step has a maximal peak in the range of 160-179 nm wavelength, preferably 165-175 nm wavelength. This first irradiation step is supposed to accelerate curing near-surface of the coated film (described later in detail).

As light sources for the irradiation, any light sources, typically Xenon excimer laser, can be used as long as it emits light of said specific wavelength. A lamp which emits light having wide-range wavelength also can be used by selecting said specific wavelength with a filter or a spectrometer.

Then, at the second irradiating step, the coated film is irradiated with light, which has a longer maximal peak wavelength than the light used in the first irradiating step and the peak wavelength is equal to or less than 230 nm, preferably in the range of 180-230 nm. This second irradiation step is supposed to accelerate curing deep part of the coated film (described later in detail). The light used in the second irradiation step may be any light that the maximal peak wavelength is longer than that used in the first irradiation step, but it should be noted that too small difference of the maximal peaks may result in the insufficient curing reaction because different part is not irradiated by the first and second irradiations. Thus, the difference of the maximal peaks of the light in the first and second irradiation steps preferably equal to or more than 10 nm wavelength, more preferably equal to or more 15 nm wavelength.

Additionally, the coated film can be irradiated with light. The wavelength of the light is not limited. As the curing accelerated part of the film in depth direction is varied depending on wavelength of the irradiation light, it can be selected depending on objectives. In specific, longer wavelength of the irradiation light can accelerate curing of deeper part of the film and shorter wavelength of the irradiation light can accelerate curing of shallower part of the film, which has already cured. Thus, the coated film can be irradiated by any wavelength at any times after the second irradiation step.

However, the third irradiation step, wherein the coated film after the second irradiation step is irradiated with light having longer maximal peak wavelength than the light used in the second irradiating step, is preferred to be after the second irradiation step. This third irradiation step enables to accelerate curing of the coated film in any depth and to improve density of the whole film. Here in, the light used in the third irradiation step, which has longer maximal peak wavelength than the light used in the second irradiation step, enables to accelerate curing the deeper part of the coated film. In the meanwhile, too long irradiation wavelength may not accelerate curing any more. Thus, the light used in the third irradiation step is preferred to have 10-60 nm wavelength longer maximal peak than the light used in the second irradiating step.

Any light sources can be used as long as it emits light of said specific wavelength at each irradiation step. A lamp which emits light having relatively wide-range wavelength such as an ultraviolet lamp and a mercury lamp can be used by selecting said specific wavelength with a filer or a spectrometer.

The mechanism that this two-step irradiation enables to obtain a dense silicic film is not fully understood, but estimated as follows. At first, the coated film, the surface of the film is cured, is formed by light having the relatively shorter wavelength in the first irradiation step. This curing film contains a high content of Si—N bonds and has excellent gas barrier performance. Thus, it reduces penetration of oxygen gas into the deep part of coated film. Additionally, when the coated film is irradiated with the light having longer wavelength, the deeper part of it is cured. As penetration of oxygen is reduced in this situation, the amount of absorbed oxygen of the curing film is reduced. Consequently, the dense coated film containing a high content of Si—N bonds is formed.

In fact, for example, when light of 230 nm wavelength is irradiated and then light of 172 nm wavelength is irradiated, the formed film results in containing a high content of Si—O bonds and a low content of Si—N bonds.

An atmosphere, wherein the coated film is irradiated, can be freely selected based on the aimed constituent of the film, but an atmosphere which prevents oxygen from penetrating into the coated film, specifically an atmosphere containing less oxygen, is preferred for irradiation. In particular, the oxygen concentration in an atmosphere is preferably equal to or less than 1000 ppm, more preferably equal to or less than 100 ppm. To meet this condition, irradiation can be done under vacuum, reduced pressure or inert gas atmosphere. Further, irradiation in the atmosphere, wherein inert gas is introduced after decompression, is also effective. Here in, inert gas such as nitrogen, argon, helium and mixture thereof can be used. Specifically, nitrogen is preferred from the point view of handling property and the like. In this case, nitrogen gas is inert and neither absorbed nor associated with increased concentration of nitrogen in the coated film. The irradiation is not necessarily carried out in an airtight chamber, and can be performed in a flow of inert gas. Further, the irradiation can be carried out in a mixture of inert gas with, for example, ammonia or nitrous oxide. In this case, as ammonia or nitrous oxide serves as a nitrogen source of Si—N bonds of the coated film, the content of Si—N bonds can be increased.

The coated film can be heated at the same time as the irradiation in the first irradiation step and second irradiation step. This heating can accelerate curing reaction. The ways of heating is freely-selected such as heating atmosphere gas.

This irradiation cures polymers including a silazane-bond in the coated film. This conversion can be monitored by means of FT-IR. Specifically, with the conversion proceeds, the absorption peaks at $3350\ cm^{-1}$ and $1200\ cm^{-1}$, which are attributed to N—H bonds, and the peak at $2200\ cm^{-1}$, which is attributed to Si—H bonds, become weak. Consequently, the curing reaction can be confirmed by observing decrease in intensity of those peaks.

Thus formed gas barrier film is excellent in stability, in density and in transparency, and hence can be used as a gas barrier film in a semiconductor device, a protective film or an insulating film. Further, the film can be also used as a top or bottom antireflective film in a process of producing a semiconductor device. Specifically, in a pattern formation process in which a resist pattern is formed by photolithography, it can be used as an antireflective film on the upper- or substrate-side surface of the resist layer in order to prevent reflection or interference in the resist layer. The coated film according to the present invention is advantageously used as an antireflective film, in particular, as a bottom antireflective film formed on a substrate-side surface of the resist layer.

The present invention is further explained below by use of the following examples.

Synthesis of Polysilazane

A four-necked flask, internal volume of 1 liter, was equipped with a gas inlet tube, a mechanical stirrer, and a dewar condenser. The flask was replaced with dry nitrogen deoxygenated and then the 1,500 ml of degassed dry pyridine was introduced in it and it was cooled with ice. Then, dichlorosilane 100 g was added, and adduct of white solid ($SiH_2Cl_2.2C_5H_5N$) was formed. The ice-cold reaction mixture was bubbled ammonia 70 g with stirring. Subsequently, it was blown for 30 minutes in the liquid layer dry nitrogen, to remove the excess ammonia.

The reaction mixture was filtered under reduced pressure in a dry nitrogen atmosphere using a Buchner funnel, and then 1,200 ml filtrate was obtained. As a result of evaporation of the pyridine using an evaporator, a perhydropolysilazane of 40 g was obtained. GPC (eluent: $CHCl_3$) a number average molecular weight of the perhydropolysilazane obtained was measured by, and was 800 in terms of polystyrene. Was measured that the IR (infrared absorption) spectrum, ($cm^{-1}$) 3350, absorption based on the N—H 1200 wave number: Si—N—Si of 1020-820: absorption based on Si—H 2170 to show an absorption-based was confirmed.

Preparation of Composition for Coating Film

In a glass beaker of capacity 100 ml, 2.5 g synthesized perhydropolysilazane and 47.5 g dibutyl ether was introduced and performed bubbling agitation by blowing for 3 minutes dry nitrogen to prepare a compound for a coating film Other compositions for a coating film were prepared the following with the addition of additives as described in Table 1.

Compounds for a coating film containing an amine compound were prepared by mixing a solution in a glass beaker of capacity 100 ml, wherein 2.5 g synthesized perhydropolysilazane and 30.0 g dibutyl ether was introduced, with a solution in a glass beaker of capacity 50 ml, wherein predetermined amine compound and 17.5 g dibutyl ether was introduced, and blowing for 3 minutes dry nitrogen, that was bubbling agitation.

Compounds for coating film containing a metal complex compound were prepared by mixing a solution in a glass beaker of capacity 100 ml, wherein 2.5 g synthesized perhydropolysilazane and 46.25 g dibutyl ether was introduced, with a solution in a glass beaker of capacity 5 ml, wherein predetermined metal complex compound and 1.25 g anisole was introduced, and by blowing for 3 minutes dry nitrogen, bubbling agitation.

Formation of Gas Barrier Film

The prepared composition for a coating film was coated on a 4-inch silicon wafer of thickness 0.5 mm, using a spin coater. After the coating, the coated film was dried at 80° C. for 3 minutes on a hot plate.

Subsequently, the coated wafer was placed into an exposure apparatus, wherein nitrogen was introduced and oxygen concentration was equal to or less than 100 ppm, and irradiated with light having maximal peak 172 nm, 190 nm, 230 nm, or 365 nm wavelength. Each irradiance was 5 mW/cm$^2$, 16 mW/cm$^2$, 3.5 mW/cm$^2$ or 3.7 W/cm$^2$. The irradiance was measured by combining Accumulated UV Meter UIT-250 with Detector VUV-S172 (light source 172 nm or 190 nm wavelength), UVD-S254 (light source 230 nm wavelength), or UVD-S365 (light source 365 nm wavelength) (all trade names, manufactured by USHIO INC.)

Evaluation

After irradiation, IR spectra of the coated film were measured by the FT-IR measurement. The thickness of coated films was measured by an ellipsometer. Thickness of all films was about 100 nm.

Then, the film was oxidation-treated in 250° C. superheated steam condition for 15 minutes. After the treatment, FT-IR was measured again.

A density and stability of formed gas barrier film was evaluated by comparing the IR spectrum after irradiation with the IR spectrum after curing in the heated steam. Specifically, each formed film was classified into the following grades:

A: IR spectra, which were before-and-after superheated steam treatment, showed little change of peak intensity at about 1000-1200 cm$^{-1}$ attributed to Si—O bonds, B: IR spectra showed a little change of peak intensity corn in comparison with A, C: IR spectra showed a big change of peak intensity in a clearly recognizable way.

Figure 2:
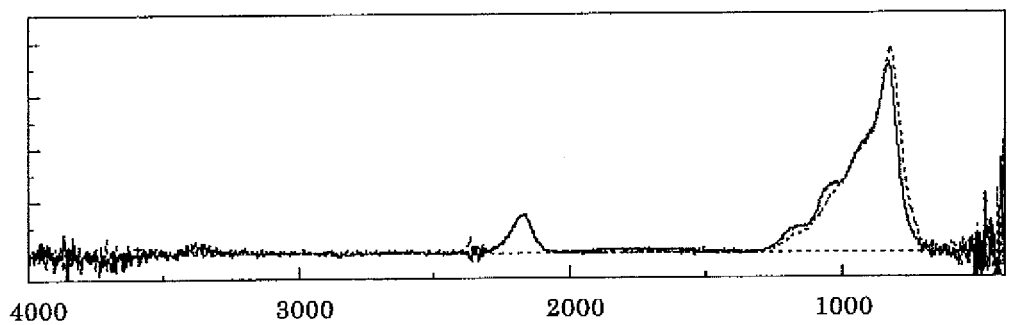
FIG. 2 is IR spectra after irradiation process (broken line) and after superheated steam process (solid line) at Example 1.
Figure 3:
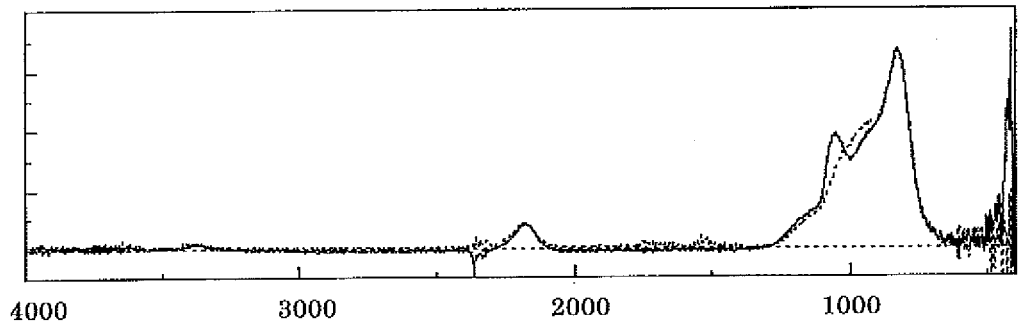
FIG. 3 is IR spectra after irradiation process (broken line) and after superheated steam process (solid line) at Example 37.

In specific, FIG. 1, FIG. 2 and FIG. 3 are results of Example 5, Example 1, and Example 37 respectively and each evaluated as A, B and C. Thus, when a dense silicic film is formed by ultraviolet irradiation, superheated steam treatment accelerates little reaction and there is little amount of peak change. On the other hand, if ultraviolet irradiation is insufficient, superheated steam treatment accelerates the reaction and there is a big change on peak intensity corresponding to a formation of Si—O bonds. The results were shown in Table 1.

TABLE 1

| | | | process condition | | | | | | |
|---|---|---|---|---|---|---|---|---|---|
| | | | The first irradiation step | | The second irradiation step | | The third irradiation step | | |
| | No. | kind of additive and additive amount | wavelength (nm) | time (min) | wavelength (nm) | time (min) | wavelength (nm) | time (min) | Evaluation |
| Ex. 1 | Present | non | 172 | 4 | 190 | 4 | | | B |
| Ex. 2 | Invention | non | 172 | 4 | 230 | 4 | | | B |
| Ex. 3 | | non | 172 | 2 | 190 | 6 | | | B |
| Ex. 4 | | non | 172 | 2 | 190 | 6 | 230 | 4 | A |
| Ex. 5 | | non | 172 | 4 | 190 | 4 | 230 | 4 | A |
| Ex. 6 | | non | 172 | 7 | 190 | 1 | 230 | 4 | B |
| Ex. 7 | | octylamine, 0.30 mmol | 172 | 4 | 190 | 4 | | | B |
| Ex. 8 | | octylamine, 0.30 mmol | 172 | 4 | 230 | 4 | | | B |
| Ex. 9 | | octylamine, 0.30 mmol | 172 | 2 | 190 | 6 | | | A |
| Ex. 10 | | octylamine, 0.30 mmol | 172 | 2 | 190 | 6 | 230 | 4 | A |
| Ex. 11 | | octylamine, 0.30 mmol | 172 | 4 | 190 | 4 | 230 | 4 | A |
| Ex. 12 | | octylamine, 0.30 mmol | 172 | 7 | 190 | 1 | 230 | 4 | A |
| Ex. 13 | | octylamine, 0.01 mmol | 172 | 4 | 190 | 4 | | | B |
| Ex. 14 | | N,N,N',N'-tetramethylhexamethylenediamine, 0.30 mmol | 172 | 4 | 190 | 4 | | | B |
| Ex. 15 | | N,N,N',N'-tetramethylhexamethylenediamine, 0.30 mmol | 172 | 4 | 230 | 4 | | | B |
| Ex. 16 | | methyldiallylamine, 0.30 mmol | 172 | 4 | 190 | 4 | | | B |
| Ex. 17 | | methyldiallylamine, 0.30 mmol | 172 | 4 | 230 | 4 | | | B |
| Ex. 18 | | dimethylbenzylamine, 0.30 mmol | 172 | 4 | 190 | 4 | | | B |
| Ex. 19 | | dimethylbenzylamine, 0.30 mmol | 172 | 4 | 230 | 4 | | | B |
| Ex. 20 | | pyrrol, 0.30 mmol | 172 | 4 | 190 | 4 | | | B |
| Ex. 21 | | pyrrol, 0.30 mmol | 172 | 4 | 230 | 4 | | | B |
| Ex. 22 | | methoxyethylamine, 0.30 mmol | 172 | 4 | 190 | 4 | | | B |
| Ex. 23 | | methoxyethylamine, 0.30 mmol | 172 | 4 | 230 | 4 | | | B |
| Ex. 24 | | hexamethyldisilazane, 0.30 mmol | 172 | 4 | 190 | 4 | | | B |
| Ex. 25 | | hexamethyldisilazane, 0.30 mmol | 172 | 4 | 230 | 4 | | | B |
| Ex. 26 | | Platinum(acetylacetonato), 0.03 mmol | 172 | 4 | 190 | 4 | | | B |
| Ex. 27 | | Platinum(acetylacetonato), 0.03 mmol | 172 | 4 | 230 | 4 | | | B |
| Ex. 28 | | Platinum(acetylacetonato), 0.03 mmol | 172 | 2 | 190 | 6 | | | A |
| Ex. 29 | | Platinum(acetylacetonato), 0.03 mmol | 172 | 2 | 190 | 6 | 230 | 4 | A |
| Ex. 30 | | Platinum(acetylacetonato), 0.03 mmol | 172 | 4 | 190 | 4 | 230 | 4 | A |

TABLE 1-continued

| | | | process condition | | | | | | |
| | | | The first irradiation step | | The second irradiation step | | The third irradiation step | | |
| No. | | kind of additive and additive amount | wavelength (nm) | time (min) | wavelength (nm) | time (min) | wavelength (nm) | time (min) | Evaluation |
|---|---|---|---|---|---|---|---|---|---|
| Ex. 31 | | Platinum(acetylacetonato), 0.03 mmol | 172 | 7 | 190 | 1 | 230 | 4 | A |
| Ex. 32 | | rhenium(carbonyl), 0.03 mmol | 172 | 4 | 190 | 4 | | | B |
| Ex. 33 | | rhenium(carbonyl), 0.03 mmol | 172 | 4 | 230 | 4 | | | B |
| Ex. 34 | | acetic acid palladium, 0.01 mmol | 172 | 4 | 190 | 4 | | | B |
| Ex. 35 | | acetic acid palladium, 0.01 mmol | 172 | 4 | 230 | 4 | | | B |
| Ex. 36 | Comparative | non | 172 | 8 | | | | | C |
| Ex. 37 | Example | non | 190 | 16 | | | | | C |
| Ex. 38 | | non | 230 | 16 | | | | | C |
| Ex. 39 | | non | 230 | 8 | 172 | 8 | | | C |
| Ex. 40 | | non | 230 | 8 | 172 | 8 | 190 | 8 | C |
| Ex. 41 | | non | 172 | 4 | 172 | 4 | | | C |
| Ex. 42 | | non | 172 | 8 | 365 | 8 | | | C |

The invention claimed is:

1. A method for producing silicic dense film comprising:
  (1) a composition preparing step, in which a composition for a coating film comprising a polymer having a silazane bond and a solvent is prepared;
  (2) a coating step, in which a coated film is formed by coating said composition for a coating film on a substrate;
  (3) the first irradiating step, in which said coated film is irradiated with light having a maximal peak in the range of 160-179 nm wavelength; and
  (4) the second irradiating step, in which the coated film after the first irradiating step is irradiated with light having 10-70 nm wavelength longer maximal peak wavelength than the light used in the first irradiating step,
and further wherein each irradiating step is carried out in an inert gas atmosphere where the oxygen concentration in said inert gas atmosphere is equal to or less than 100 ppm.

2. The method according to claim 1, wherein irradiation light, which has a maximal peak in the range of 180-230 nm wavelength, is used at said second irradiating step (4).

3. The method according to claim 1, wherein irradiation light, which has a maximal peak in the range of 165-175 nm wavelength, is used at said first irradiating step.

4. The method according to claim 1, further comprising (5) the third irradiating step, in which the coated film after the second irradiating step is irradiated with light having 10-60 nm wavelength longer maximal peak wavelength than the light used in the second irradiating step.

5. The method according to claim 4, wherein irradiation light, which has a maximal peak in the range of 180-230 nm wavelength, is used at the third irradiating step.

6. The method according to claim 1, wherein said polymer having a silazane bond is a polysilazane.

7. The method according to claim 6, wherein the polysilazane is a perhydropolysilazane.

8. The method according to claim 6, wherein the polysilazane is an organopolysilazane.

9. The method according to any of claim 1, wherein the composition for coating film further comprises an additive.

10. The method according to claim 9, wherein said additive is an amine compound.

11. The method according to claim 10, wherein said amine compound is selected from the group consisting of monoamine compounds, diamine compounds, allylamine compounds, benzylamine compounds, pyrrole compounds, pyridine compounds, pyrazine compounds,—alkoxyalkylamine compounds, aminoalkylether compounds, and disilazane compounds.

12. The method according to claim 9, wherein said additive is a metal complex compound.

13. The method according to claim 12, wherein said metal complex compound contains metal selected from the group consisting of nickel, titanium, platinum, rhodium, cobalt, iron, cobalt, iridium, aluminum, ruthenium, palladium, rhenium and tungsten.

14. The method according to claim 12, wherein said metal complex compound has an acetylacetonato group, a carbonyl group or a carboxylate group.

15. The method according to claim 14, wherein said carboxylate group is a residue of carboxylic acid selected from the group consisting of formic acid, acetic acid, propionic acid, butyric acid, octane acid, lauric acid, stearic acid, oleic acid, lactic acid, succinic acid and citric acid.

16. The method according to claim 1, wherein said inert gas atmosphere is nitrogen gas atmosphere.

17. A dense silicic film produced by the method according to claim 1.

18. The method according to claim 4 wherein said polymer having a silazane bond is a polysilazane.

19. A method for producing silicic dense film comprising:
  (1) a composition preparing step, in which a composition for a coating film comprising a polymer having a silazane bond and a solvent is prepared;
  (2) a coating step, in which a coated film is formed by coating said composition for a coating film on a substrate;
  (3) the first irradiating step, in which said coated film is irradiated with light having a maximal peak in the range of 160-179 nm wavelength; and
  (4) the second irradiating step, in which the coated film after the first irradiating step is irradiated with light having 10-70 nm wavelength longer maximal peak wavelength than the light used in the first irradiating step, and further wherein each irradiating step is carried out in vacuum.

* * * * *